United States Patent
Olds et al.

(10) Patent No.: US 6,957,300 B2
(45) Date of Patent: Oct. 18, 2005

(54) REDUCING DELAY OF COMMAND COMPLETION DUE TO OVERLAP CONDITION

(75) Inventors: Edwin S. Olds, Norman, OK (US); Jack A. Mobley, Oklahoma City, OK (US); Mark D. Hertz, Oklahoma City, OK (US); Kenny T. Coker, Mustang, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 364 days.

(21) Appl. No.: 10/143,235

(22) Filed: May 10, 2002

(65) Prior Publication Data

US 2003/0105919 A1     Jun. 5, 2003

Related U.S. Application Data

(60) Provisional application No. 60/334,351, filed on Nov. 30, 2001.

(51) Int. Cl.[7] .............................................. G06F 12/00
(52) U.S. Cl. ...................... 711/112; 111/112; 111/113; 111/137; 111/144; 111/158; 111/204; 111/213
(58) Field of Search ....................... 711/112, 113, 144, 711/158, 111, 137, 204, 213

(56) References Cited

U.S. PATENT DOCUMENTS

| | | | |
|---|---|---|---|
| 5,623,608 A | * | 4/1997 | Ng .............................. 711/137 |
| 5,745,732 A | * | 4/1998 | Cherukuri et al. ........... 711/168 |
| 5,758,153 A | * | 5/1998 | Atsatt et al. ............. 707/103 R |
| 5,983,319 A | | 11/1999 | Ito |
| 6,263,408 B1 | | 7/2001 | Anderson et al. |
| 6,487,599 B1 | * | 11/2002 | Smith et al. ................. 709/229 |
| 2003/0204675 A1 | * | 10/2003 | Dover et al. ................. 711/137 |

* cited by examiner

Primary Examiner—Mano Padmanabhan
Assistant Examiner—Mehdi Namazi
(74) Attorney, Agent, or Firm—Fellers, Snider, et al.

(57) ABSTRACT

Method and apparatus for transferring data between a host device and a data storage device having a first memory space and a second memory space. The host issues access commands to store and retrieve data. The device stores commands in the first memory space pending transfer to the second memory space. An interface circuit evaluates relative proximity of first and second sets of LBAs associated with pending first and second commands, and delays promotion of later pending commands in front of earlier pending commands during an overlap condition. If the overlap is caused by performance enhancing features (PEF) the PEFs are disabled so the commands can be scheduled for disc access. Indicators are set in the commands to signal that a PEF has caused the overlap and that PEF can be disabled. Values are added to indicators in the commands such that the PEFs can be modified and avoid overlaps.

17 Claims, 6 Drawing Sheets

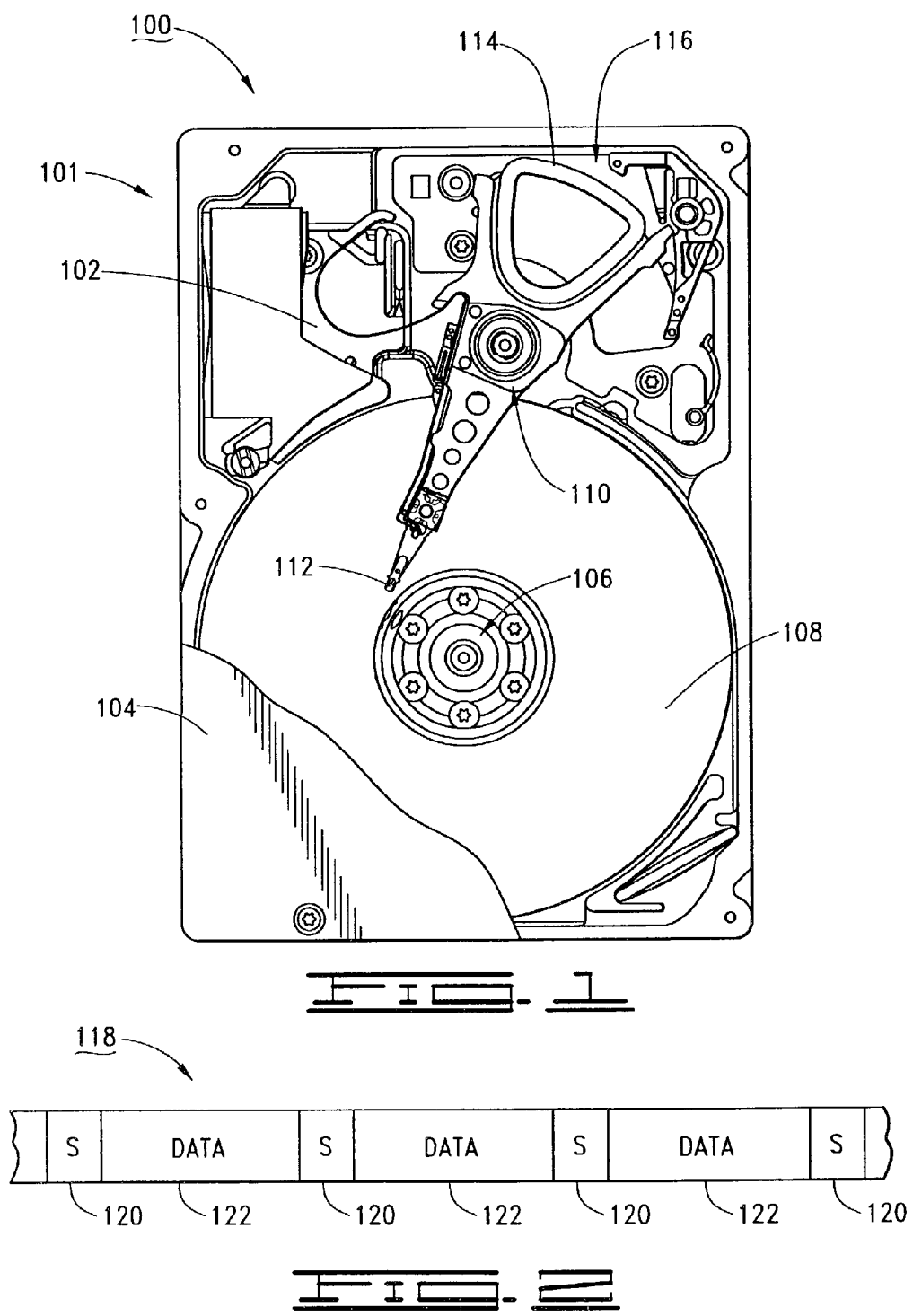

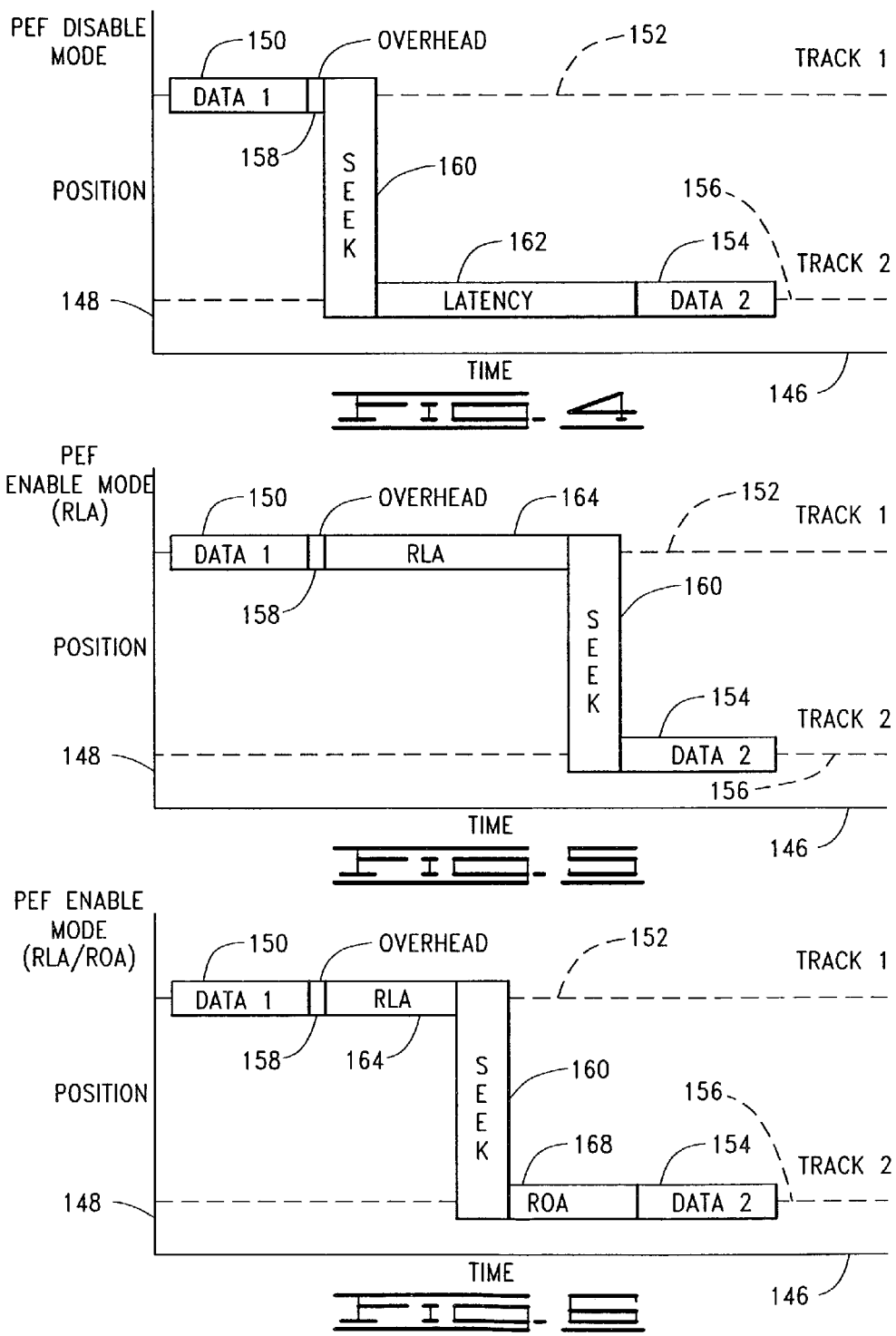

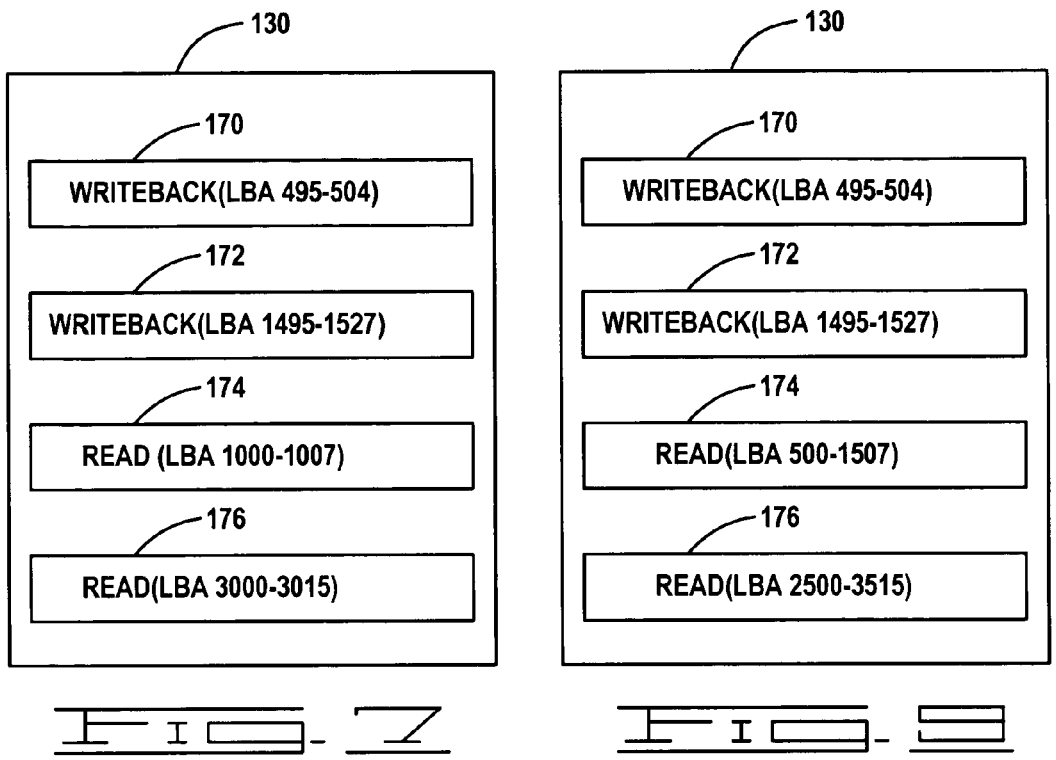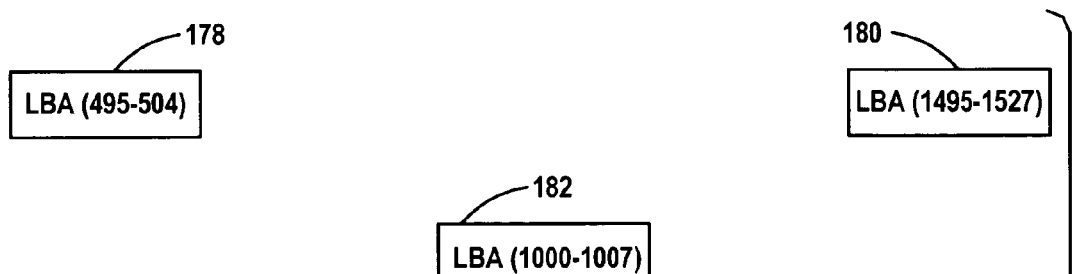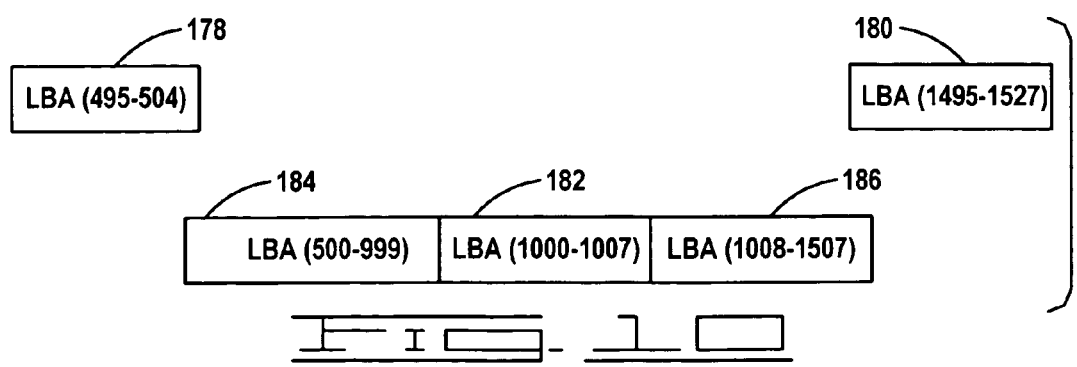

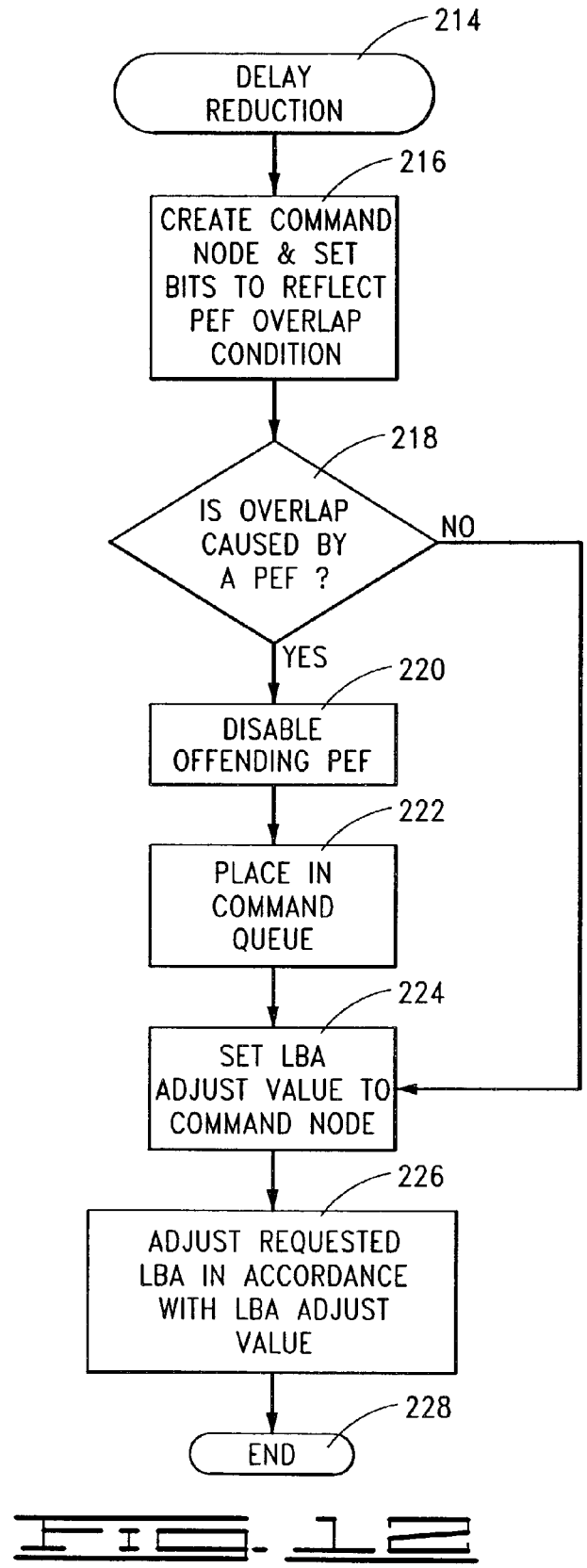

REDUCING DELAY OF COMMAND COMPLETION DUE TO OVERLAP CONDITION

RELATED APPLICATIONS

This application claims priority to U.S. Provisional Application No. 60/334,351 filed Nov. 30, 2001.

FIELD OF THE INVENTION

The claimed invention relates generally to the field of disc drive data storage devices, and more particularly, but not by way of limitation, to an apparatus and method for optimizing the transfer of data between a host device and a disc drive data storage device.

BACKGROUND

A disc drive is a data storage device used to store digital data. A typical disc drive includes a number of rotatable magnetic recording discs that are axially aligned and mounted to a spindle motor for rotation at a high constant velocity. A corresponding array of read/write heads access the discs to write data to and read data from the discs.

The discs are divided into a number of addressable blocks that are assigned host-level addresses (sometimes referred to as logical block addresses or LBAs). Each LBA typically has a corresponding physical block address (PBA) used by servo control circuitry to align a head with the appropriate portion of the medium to access the desired LBA.

In addition to the servo control circuitry to move the heads to the various tracks, the disc drives are also provided with read/write channel circuitry to write data to and read data from the discs, and interface control circuitry to facilitate communication and data transfer with a host device. A disc drive is typically configured to operate in accordance with an industry standard interface protocol, such as Small Computer Systems Interface (SCSI) or AT Attached (ATA, and known widely as IDE). Communications and data transfers are carried out between host and drive in accordance with these protocols.

Disc drives of the present generation typically accommodate command queuing, which allows multiple input/output (I/O) commands to be received in a command queue and executed by the drive in an order different than that received. SCSI protocols currently support up to 256 pending commands in the command queue, while ATA protocols allow up to 32 commands. A search strategy is used to execute the commands in an order that will potentially provide the highest transfer rate. For example, if several commands require access to data blocks close to the current position of the heads, and other commands require access to data blocks at distant locations on the discs, the drive may proceed to execute all of the local accesses before moving the heads to the distant locations and accessing the data blocks at the distant locations to minimize seek time (i.e., time spent moving from one track to the next).

The time required for a particular data block to rotate around and reach the head (latency) is an important factor when selecting the execution order, as delays in waiting for the disc to rotate significantly decrease the resulting transfer rate. Selection of the execution order typically includes estimating how much time it would take to reach each of the data blocks associated with the pending access commands based on latency and the time required to perform any necessary head switches and seeks.

A disc drive can typically employ various run-time selectable strategies (parameters) to improve the host throughput and read cache hit ratio, such as read on arrival (ROA) and read look ahead (RLA). ROA and RLA generally entail reading data blocks and placing the contents into the data buffer even though the host has not specifically requested the data from such data blocks, on the basis that the host may request the data in the near future.

ROA involves performing a seek command to move the head to a destination track on which a target data block resides, and commencing to read the data blocks on the track that precede the target data block until the target data block reaches the head. By contrast, RLA involves receiving a command to move to a new target track, but because the target data block is a large angular distance away from the head, the drive delays seeking to the new track and instead maintains the head on the current track and reads additional data blocks on the current track before moving to the destination track and reading the target data block. The foregoing strategies can provide improved performance under certain circumstances, such as when the command stream has a high degree of locality.

Another run-time selectable parameter that can improve host throughput is write caching. Write caching involves delaying the writing of data received from the host in favor of execution of other previously requested accesses (as opposed to immediately writing the data upon receipt). Advantages associated with write caching include the fact that more commands are available to choose from during the sorting strategy, which statistically improves overall access times.

However, allowing a command to be considered for disc access before other commands that have been in the system longer creates potential overlap problems. One of these problems occurs when a newer read command is promoted ahead of an older write command. If the older write command has cached data or a pending command that has not yet been written to disc and the newer read command is requesting data in the same LBA range as that of the older write command, old data will be accessed by the read command. If the read command goes to disc without recognition of the older cached write data an undesired overlap occurs. Other variations of overlap conditions can occur as well.

Overlap problems can also occur when a newer write command is improperly promoted ahead of an older read command. A write command that is given disc access before an older read command that is requesting data that overlaps the LBA range of the write command results in a read of newer data than that requested. Similarly, an older read command could recognize and send newer write cache data as a read cache hit instead of going to disc.

Disc drives typically avoid the improper promotion of commands by performing overlap checking. An overlap check takes place when a newer command is considered for promotion in front of older commands. The LBA range of a command considered for promotion is compared to the LBA range of the older commands. If the LBA ranges do overlap then the newer command is prevented from promotion until the overlap condition no longer exists, i.e., the older command has been executed.

The process of overlap checking can be complicated by the use of performance enhancing features (PEF) such as ROA and RLA. Unlike an overlap check that takes place with PEFs disabled, the LBA ranges of pending read commands are not known. Although the LBA range attributable to the requested data is known, the LBA range attributable to the PEFs is not known. The uncertainty is due to the inability of the system to determine the LBA range prior to the scheduling of a command for disc access since the LBA range added by a PEF cannot be determined until the order of commands is determined.

Disc drives compensate for the inability to check for overlap of the LBA ranges due to PEFs by adding LBAs to the existing LBA range of pending read commands. The added LBAs reflect the largest case scenario that could be attributed to a PEF. The extended amount can be the size of a cache segment or of some virtual cache structure. The enlarged ranged of LBAs then undergoes an overlap check with the LBA ranges of pending commands.

However, the enlarged LBA range creates an additional problem due to the overlap check. The significant increase in LBA range results in an increased incidence of detected overlaps. Since the commands responsible for the overlap are not granted disc access until the overlap condition ends and pending write commands are not allowed to be cached, commands are forced to remain in the buffer for a longer period of time. The delay diminishes disc data throughput.

Accordingly, there is a need for improvements in the art to provide effective control of cached commands in a disc drive to improve data transfer performance.

SUMMARY OF THE INVENTION

In accordance with preferred embodiments, a disc drive data storage device is provided with a buffer (first memory space) and a number of rotatable discs (second memory space).

A host device issues access commands to the disc drive from time to time to transfer data between the host device and the discs. Such access commands include write commands to write sets of data (writeback data) to respective logical block addresses (LBAs) defined on the disc surfaces, and read commands to retrieve sets of previously recorded data (readback data) from selected LBAs on the disc surfaces.

A hardware/firmware based interface circuit employs caching so that read commands and writeback data are temporarily stored in the buffer pending transfer to the discs in accordance with a sort strategy that sorts the pending read and write access commands in an order designed to optimize data transfer performance.

Performance enhancing features (PEF) such as read on arrival (ROA) and read look ahead (RLA) are employed in conjunction with read commands to cache nonrequested data for later use. LBA addresses associated with recent access commands are compared to LBA addresses of older commands to find overlaps. Newer access commands that cause overlaps are delayed until the overlap condition is no longer present.

Indicators are employed in each command to signal an overlap condition caused by a PEF. The indicators include information to notify the interface circuit that a particular PEF has caused an overlap condition so that the interface circuit can disable the offending PEF. Once the overlap condition is eliminated the command can then be scheduled for disc access.

Additional indicators in each command include information the interface circuit may use to reinstitute a modified PEF that avoids the overlap condition. After the delayed command is scheduled for disc access, LBAs associated with prior pending commands are known. These LBAs may be used to compute the maximum allowable LBAs that can be included in a read command and associated with a PEF so as to avoid an overlap with prior pending commands. Delay in the newest commands due to a PEF and an overlap condition can therefore be reduced.

These and various other features and advantages that characterize the claimed invention will be apparent upon reading the following detailed description and upon review of the associated drawings.

BRIEF DESCRIPTION OF THE DRAWINGS

FIG. 1 is a plan view of a disc drive constructed and operated in accordance with preferred embodiments of the present invention.

FIG. 2 shows the manner in which embedded servo data are arranged on each of the disc recording surfaces of the disc drive of FIG. 1.

FIG. 4 is a timing diagram to generally illustrate operation of the disc drive without performance enhancing features (PEF).

FIG. 5 is a timing diagram to generally illustrate operation of the disc drive with read look ahead (RLA) employed.

FIG. 6 is a timing diagram to generally illustrate operation of the disc drive with both read look ahead (RLA) and read on arrival (ROA) employed.

FIG. 7 generally illustrates a buffer with commands awaiting disc access.

FIG. 8 generally illustrates pending commands and their associated logical block address (LBA) ranges.

FIG. 9 is another illustration of a buffer with commands awaiting disc access.

FIG. 10 is another illustration of pending commands and their associated (LBA) ranges.

FIG. 12 is a flow chart for a DELAY REDUCTION routine, which is executed as a subroutine of the DATA TRANSFER routine of FIG. 11.

DETAILED DESCRIPTION

Figure 3:
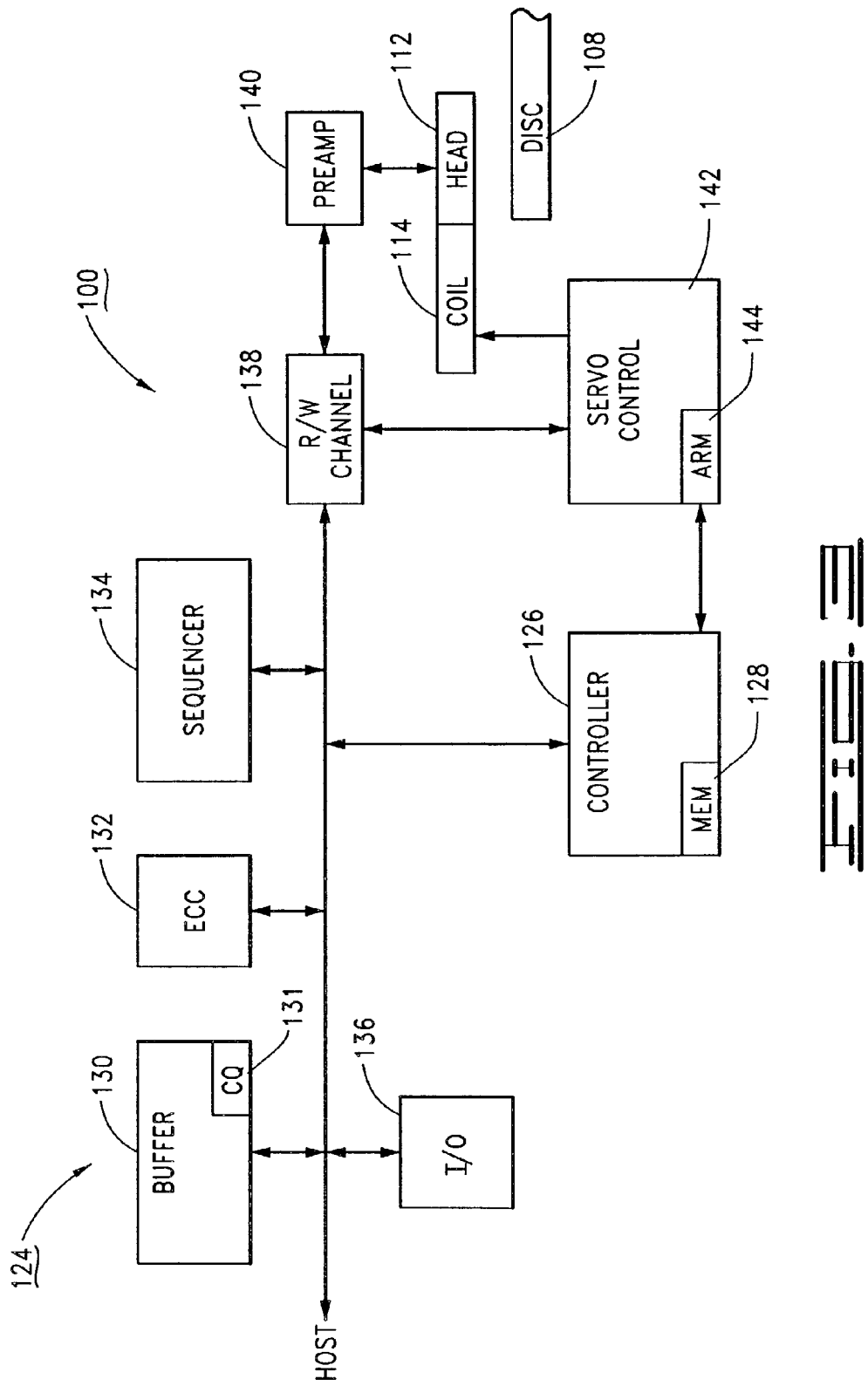
FIG. 3 is a functional block diagram of the disc drive.

Referring now to the drawings, FIG. 1 provides a top plan view of a disc drive block data storage device 100. The disc drive 100 includes a sealed housing 101 formed by a rigid base deck 102 and a top cover 104 (shown in partial cutaway).

Mechanical components of the disc drive 100 are supported within the housing 101, including a spindle motor 106 which rotates a number of recording discs 108 at a constant high speed, and an actuator assembly 110 supports a corresponding number of data transducing heads 112 adjacent the discs 108. The actuator assembly is rotated about an actuator axis through application of current to a coil 114 of a voice coil motor (VCM) 116.

Data are stored on a number of concentric tracks defined on the discs 108. FIG. 2 shows a portion of a track 118 from a selected disc surface. The track 118 includes a plurality of angularly arranged servo data fields 120. The servo data fields 120 provide position information used by servo control circuitry of the disc drive 100 to control the position of the heads 112.

User data from a host device are stored in data sectors defined in data areas 122 between adjacent pairs of the servo data fields 120. Each data sector stores a fixed amount of user data (such as 512 bytes) and is separately addressable by the host using a logical block address (LBA). The respective numbers of servo data fields 120 and data sectors per track can vary, but typical numbers for disc drives of the present generation are around 150–250 servo data fields and around 300–1000 data sectors per track. A typical disc drive can thus have several million consecutively numbered LBAs, depending upon the data capacity and format of the drive.

FIG. 3 provides a functional block diagram for the disc drive 100. A hardware/firmware based interface circuit 124 communicates with a host device (such as a personal computer, not shown) and directs overall disc drive operation. The interface circuit 124 includes a programmable controller (processor) 126 with associated memory 128, a buffer 130, an error correction code (ECC) block 132, a sequencer 134 and an input/output (I/O) control block 136.

The buffer 130 (also referred to herein as a "first memory space") temporarily stores user data during read and write operations, and includes a command queue (CQ) 131 where multiple pending access operations are temporarily stored pending execution. The ECC block 132 applies on-the-fly error detection and correction to retrieved data. The sequencer 134 asserts read and write gates to direct the reading and writing of data. The I/O block 136 serves as an interface with the host device.

FIG. 3 further shows the disc drive 100 to include a read/write (R/W) channel 138 which encodes and serializes data during write operations and reconstructs user data from the discs 108 during read operations (the discs are also referred to herein as a "second memory space"). A preamplifier/driver circuit (preamp) 140 applies write currents to the heads 112 and provides preamplification of readback signals.

A servo control circuit 142 uses the servo data from the servo data fields 120 (FIG. 2) to provide the appropriate current to the coil 114 to position the heads 112 as required. The servo control circuit 142 preferably comprises a programmable ARM processor 144 (Advanced Reduced-Instruction-Set-Computer (RISC) Machine). The controller 126 communicates with the ARM 144 to move the heads 112 to the desired locations on the discs 108 during execution of the various pending access commands in the command queue 131 in turn.

As discussed below in greater detail, the interface circuitry 124 advantageously operates to optimize disc data throughput by dynamically switching from a mode of operation in which performance enhancing functions (PEF) are disabled to a mode of operation in which PEFs are enabled in relation to a detected access pattern in read commands issued by the host device. During a PEF enable mode of operation nonrequested user data are retrieved from the discs 108 and placed into the buffer 130 in anticipation of a future request for the nonrequested user data. During a PEF disable mode of operation, such nonrequested user data are not retrieved from the recording medium and are not placed into the buffer.

FIGS. 4–6 have been provided to compare and contrast PEF enable and PEF disable modes of operation in greater detail.

FIG. 4 is a timing diagram to illustrate a PEF disable mode operation. PEF disable mode is appropriate when the host device is requesting data in an apparently random fashion; that is, subsequent requests are for data sectors in nonconsecutive and non-proximate positions within the LBA addressing scheme. Thus, the probability of the disc drive 100 satisfying a future request for data from cached nonrequested data is very low, and the additional processing time required to place nonrequested data into the buffer 130 provides little or no benefit (and can actually reduce host throughput slightly). Thus, no nonrequested data are placed into the buffer 130 during the PEF disable mode operation of FIG. 4.

The diagram of FIG. 4 is plotted against a horizontal time axis 146 and a vertical position axis 148. First and second consecutive read commands are carried out to retrieve data from a first set of data sectors (DATA 1 block 150) on a first data track 152 and then from a second set of data sectors (DATA 2 block 154) on a second data track 156. Reading from left to right and understanding that the respective elapsed times are not necessarily represented to scale, the disc drive first transfers the DATA 1 requested data associated with the first executed read command (block 150).

After a short overhead processing time (block 158) during which the interface circuit 124 identifies the second read command as the next appropriate command to execute, the controller 126 instructs the servo control circuit 142 to execute a seek (block 160) to move a selected head 112 to the second track 156. It will be recognized that the seek may include a head switch operation to activate and use a different selected head 112.

Once the selected head 112 reaches the second track 156, the disc drive 100 incurs a latency delay (represented by latency block 162) during which time the drive waits for the data sectors associated with the DATA 2 block 154 to reach the selected head 112. The drive 100 then reads the DATA 2 block 154 and transfers this requested data to the buffer 130 for subsequent transfer to the host device.

By contrast, FIG. 5 provides a timing diagram for a selected PEF mode of operation of the disc drive 100. FIG. 5 employs a read look ahead (RLA) technique. After the requested user data in the DATA 1 block 150 are transferred to the buffer 130 and the interface circuit 124 performs the requisite concurrent processing of the overhead block 158, the selected head 112 remains on the first track 152 (absent a seek instruction from the controller 126) and continues to read nonrequested data from data sectors on the first track 152 (as indicated by RLA block 164). These nonrequested data are placed into the buffer 130 pending a possible future request by the host device.

The interface circuit 124 next instructs the servo control circuit 142 to execute the seek (block 160) to move the selected head 112 to the second track 156 and transfers the requested DATA 2 data (block 154) to the buffer 130.

The time during which RLA data are obtained is preferably determined in relation to the available elapsed time (phase) between the end of the first command and the beginning of the second command. Thus, for example, if there is a 4 millisecond (4 ms) calculated phase between the first and second commands, and the seek will take 2 ms to perform, then RLA data can be accumulated for a little less than 2 ms. Since discs rotating at about 10,000 revolutions per minute require about 6 ms per rotation, then up to about a third of a track of nonrequested readback data can be obtained from the first track 152 in this example.

Use of the RLA local mode of FIG. 5 is advantageous when the host device is requesting data in an increasing sequence. Other PEF modes are readily contemplated, however. For example, FIG. 6 shows a local mode that uses both read look ahead (RLA) and read on arrival (ROA) techniques.

As before, the interface circuit 124 executes the first read command to recover the requested data from the DATA 1 block 150, performs the necessary overhead processing at block 158, and concurrently performs some RLA reading additional blocks on the first track 152 at block 164.

The interface circuit 124 then instructs the seek 160 to occur to move the selected head 112 to the second track 156. Once servo qualification has occurred so that the second head 112 is on track and ready to read data, the interface circuit 124 causes the head 112 to immediately start reading nonrequested data sectors upon arrival, as indicated by ROA block 168 until the DATA 2 block 154 reaches the head 112.

Any number of variations of RLA and ROA can be used as desired. Although not shown in a separate drawing, it will now be readily understood that a full ROA technique could readily be used. Such a case would have a similar timing diagram to that shown in FIG. 4 except that nonrequested ROA data would be read during the latency block 162.

FIG. 7 provides an illustration of a portion of a buffer 130 (FIG. 3) in which commands are awaiting disc access. Accompanying each command is an LBA range requested in accord with each command. For example, writeback commands 170, 172 (or write commands for which no data transfer has taken place) are requesting access to LBAs 495–504 and 1495–1527 respectively. Also, read commands 174, 176 are requesting access to LBAs 1000–1007 and 3000–3015.

For purposes of the present discussion, it is assumed that the commands 170, 172, 174, 176 are listed in the order in which they were received from the host. Since the interface circuit 124 (FIG. 3) evaluates each command for the most efficient order in which to execute, the interface circuit 124 must insure that commands are not incorrectly promoted. The LBA ranges of commands must be checked for an overlap condition. If, for example, read command 174 was a candidate for promotion ahead of commands 170 and 172, the LBA range of read command 174 would be checked for an overlap condition with the LBA ranges of commands 170 and 172. The overlap check can be effectively demonstrated by reference to FIG. 8.

FIG. 8 demonstrates the LBA ranges for each of commands 170, 172 and 174 (FIG. 7). Although not drawn to scale, LBA ranges 178, 180 and 182 correspond to commands 170, 172 and 174. If the command associated with LBA range 182 was a candidate for promotion ahead of LBA ranges 178 and 180, no problems would be created as a result of overlapping LBAs. As can be seen, LBAs 1000–1007 do not overlap with either of LBA ranges 495–504 or 1495–1527. Therefore, LBA range 182 could be scheduled for disc access without a delay due to an overlap.

When PEFs such as RLA or ROA are enabled in a disc drive system, typical overlap checking methodology must be modified. Since the LBA range of a command cannot be known prior to scheduling of that command for disc access, a precise overlap check cannot be performed. A number of LBA blocks are therefore added to a command that is a candidate for promotion ahead of older pending commands. The number of LBA values added is dependent upon the cache size and structure in use for the PEF. Addition of LBA values is demonstrated by reference to FIGS. 9 and 10.

FIG. 9 provides an illustration of the buffer region 130 of FIG. 7 in which PEFs such as ROA and RLA are enabled. As can be seen in FIG. 9, 500 LBAs have been added to the front and back of commands 174 and 176. Although 500 LBAs is an arbitrary amount chosen for the purpose of discussion, it is assumed the amount selected compensates for a suitable amount of nonrequested data in which ROA or RLA might be called upon to read into cache. If command 174 (or 176) is considered for promotion ahead of commands 170 or 172 an overlap check is performed on the expanded LBA range of the command under consideration for promotion.

FIG. 10 illustrates the LBA ranges of commands 170, 172 and 174 as expanded due to the addition of 500 LBAs to each end (184, 186) of the requested LBAs to compensate for ROA and RLA. Although not drawn to scale, it can be seen that the LBA range 182 as expanded by 184 and 186 overlaps with LBA ranges 178 and 180. Consequently, promotion of the command that corresponds to LBA range 182 (174 in FIG. 7) ahead of the commands that correspond to either of LBA ranges 178 or 180 (commands 170, 172 in FIG. 7) is not permitted due to the possibility of incorrect data being returned to the host. In this case, command 174 must be delayed until such time as commands 170 and 172 have been executed. This can cause significant delays before the read data is returned to the host.

Figure 11:
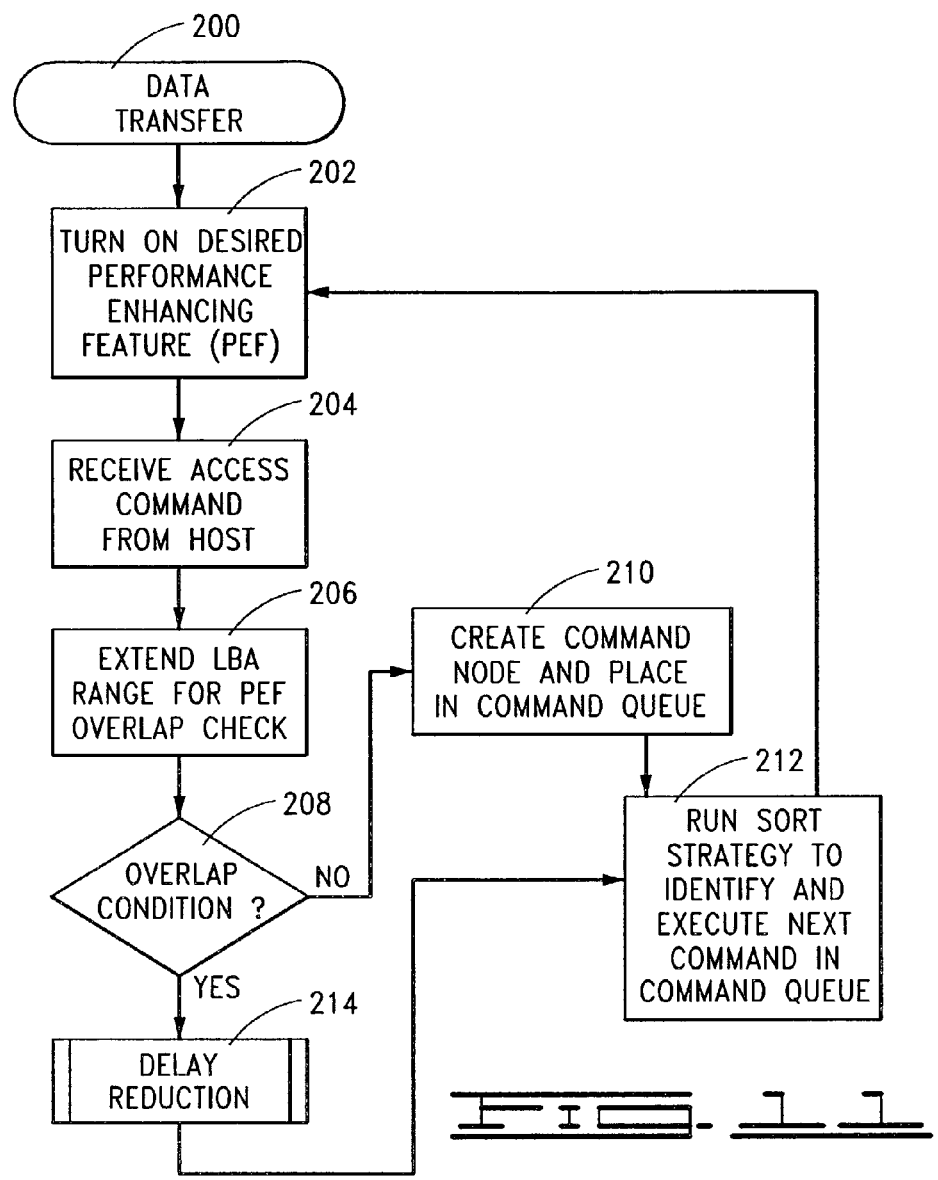
FIG. 11 is a flow chart for a DATA TRANSFER routine, generally illustrative of steps carried out by the disc drive in accordance with preferred embodiment of the present invention to transfer data between the disc drive and a host device.

FIG. 11 provides a flow chart for a DATA TRANSFER routine 200, illustrative of steps carried out by the interface circuit 124 in accordance with preferred embodiments of the present invention. At step 202 any desired PEF, such as ROA and RLA, is activated. Although every available PEF may be activated, any combination of those available is also acceptable. Thereafter, the disc drive 100 proceeds with normal operation during which access commands are issued by the host device and received by the interface circuit 124, as indicated at step 204.

As will be recognized, during operation the host device issues access commands from time to time at a rate and in an order as determined by the needs of the host. Thus, there can be times when access commands are issued relatively infrequently and other times when a large number of access commands are issued in rapid succession. Each read access command identifies the LBAs on the discs 108 the contents of which the host requires the disc drive 100 to retrieve. Each write access command includes the write data that the host requires the disc drive 100 to store and identifies the specific LBAs in which the disc drive is to store the write data. The interface circuit 124 creates a command node as a sortable access instruction in the command queue 131 for each new command.

At step 206 the LBA range is extended to provide for an overlap check for those commands that make use of a particular PEF, as described and shown in FIGS. 9 and 10. As discussed above, the LBA range is extended beyond the 30 requested LBA range to include nonrequested data in the possible LBA range attributable to any PEF.

Decision step 208 next determines whether any new command considered for promotion over older pending commands is causing an overlap condition. The LBA range of the candidate for promotion is compared to the l BA range of older pending commands. If no overlap condition exists the command is promoted ahead of the older pending commands at step 210. A command node is created for this command and placed in the command queue 131. The interface circuit 124 then runs a sort strategy to identify and execute the next command in the command queue 131.

If an overlap condition caused by a candidate for promotion is detected at decision step 208, the routine then proceeds to the DELAY REDUCTION routine 214 of FIG. 12. Step 216 then creates a command node for that command and sets bits in the command node to reflect the overlap condition relative to any PEFs. It is contemplated that each PEF has a bit available in the command node such that an overlap condition is signaled for each incidence of overlap caused by a PEF.

Overlap conditions can exist in a variety of ways. Although each PEF can cause its own overlap, the requested data itself can also cause an overlap condition. A sensed overlap condition can be due to any combination of requested and nonrequested data. The indicators set at step 216 reflect each PEF and their effects on overlap.

At decision step 218, the routine checks the bits that were set in the previous step to determine whether a PEF did in fact cause the overlap condition. If the overlap condition was not caused by a PEF, the DELAY REDUCTION routine skips to step 224 to add an adjustment value indicative of the situation (such as −999) and ends since the LBA adjust value will not be used in step 226 for this condition. The routine then returns to step 212 where commands in the command queue 131 are executed in accordance with the system sort strategy. Ending the DELAY REDUCTION routine in this way reflects that the overlap condition is caused by requested data and that adjustment of any PEFs would not cure the overlap condition. Instead the delay is left to be dealt with by normal sort strategies.

If the overlap condition is found to be caused by a PEF, the routine proceeds to step 220 where the offending PEF or PEFs are disabled. This step eliminates the overlap condition since the nonrequested data causing the overlap and associated with the PEF is no longer causing an overlap. The command is then placed in the command queue at step 222. In one preferred embodiment the routine ends at this point since the overlap condition has been eliminated and the command can be executed.

Placement of the command in the command queue schedules the command for disc access. Not until the command is scheduled for disc access can an accurate measure of allowable nonrequested data be calculated. Scheduling allows any disabled PEF to be reinstituted to a threshold that does not overlap with any pending command. At step 224 an adjustment value is set in the command node to reflect this threshold such that a disabled PEF can be reinstated to an optimum level. This value can be an integer or other suitable measure in which the LBA values can be expanded.

Figure 13:
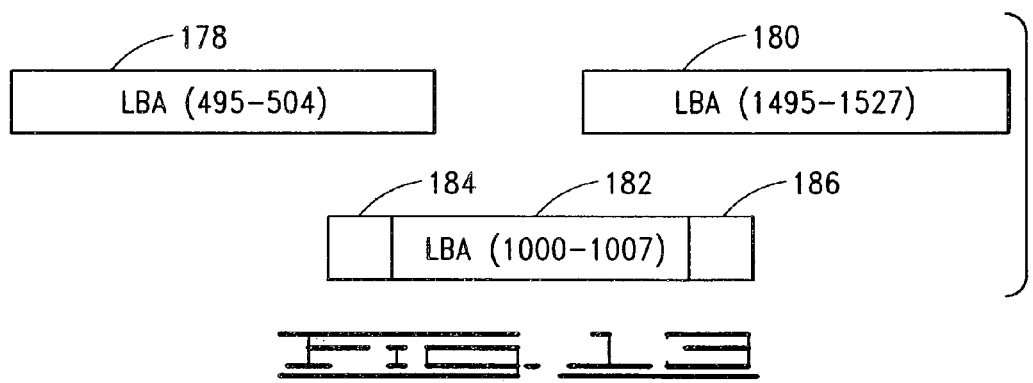
FIG. 13 is yet another illustration of pending commands and their associated (LBA) ranges.

The adjustment value is best demonstrated by reference to FIG. 13. Although not drawn to scale, it is shown that the requested LBA range 182 associated with command 174 is expanded by LBA ranges 184, 186. The expanded LBA ranges 184, 186 are calculated to provide the maximum amount of LBAs of nonrequested data attributable to PEFs. LBA ranges 184, 186 extend to LBA ranges 178, 180 but do not overlap. The command is then adjusted at step 226 to this level and the routine ends at step 228.

Return to step 212 of the DATA TRANSFER routine then allows the interface circuit to run the normal sort strategy with the adjusted commands, thereby reducing delays and increasing system efficiency.

The methods above may be conducted separately or in unison. It is contemplated that disabling of a PEF can take place without any further action, or that adjustment of a PEF request can take place without any further action. Similarly, concurrent application of each method may be used in various embodiments.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the data transfer routine without departing from the spirit and scope of the present invention.

In addition, although the embodiments described herein are directed to the transfer of data in a disc drive, it will be appreciated by those skilled in the art that the process can be used in other types of data storage devices without departing from the spirit and scope of the claimed invention.

What is claimed is:

1. An apparatus comprising an interface circuit that processes commands to transfer data between a host device and a data storage medium, wherein the interface circuit selectively employs a performance enhancing feature such that, during the processing of a read command, nonrequested data are stored in an intermediate memory location when the performance enhancing feature is enabled, and wherein the interface circuit disables the performance enhancing feature in response to a potential overlap conflict detected between first and second commands such that, during the processing of a subsequent read command, nonrequested data are not stored in an intermediate memory location while the performance enhancing feature is disabled.

2. The apparatus of claim 1, wherein the interface circuit further executes a sort strategy on the first and second commands after the performance enhancing feature is disabled and executes said commands in an order determined by said sort strategy.

3. The apparatus of claim 1, wherein the interface circuit employs a notifier in conjunction with the first and second commands which provides a status regarding whether the performance enhancing feature is enabled or disabled for each said command.

4. An apparatus comprising an interface circuit that processes commands to transfer data between a host device and a data storage medium, wherein the interface circuit selectively employs a performance enhancing feature such that, during the processing of a read command, nonrequested data are stored in an intermediate memory location when the performance enhancing feature is enabled, and wherein the interface circuit modifies operation of the performance enhancing feature to reduce the amount of nonrequested data stored in the intermediate memory location to avoid a potential overlap conflict between a first command and a second command.

5. The apparatus of claim 4, wherein the interface circuit further executes a sort strategy on the first and second commands after the performance enhancing feature is modified and executes said commands in an order determined by said sort strategy.

6. The apparatus of claim 4, wherein the interface circuit employs a notifier in conjunction with the first and second commands which provides a status regarding whether the performance enhancing feature is modified for each said command.

7. The apparatus of claim 6, wherein the notifier includes an adjustment value by which the nonrequested value is reduced to avoid the potential overlap conflict.

8. A method comprising:
   enabling a performance enhancing feature that retrieves nonrequested data from a second memory space and places that data in a first memory space;
   receiving first and second commands to transfer data between the second memory space and a host computer; and
   disabling the performance enhancing feature when a potential overlap conflict exists between a first set of data sectors associated with the first command and a second set of data sectors associated with the second command so that nonreguested data are not placed into the first memory space while the performance enhancing feature is disabled.

9. The method of claim 8, further comprising steps of executing a sort strategy on the first and second commands after the performance enhancing feature is disabled and executing said commands in an order determined by said sort strategy.

10. The method of claim 8, wherein the disabling step comprises employing a notifier with the first and second commands which provides a status regarding whether the performance enhancing feature is disabled for each said command.

11. The method of claim 8, wherein the enabling step comprises enabling a plurality of performance enhancing features, and wherein the notifier comprises a bit for each performance enhancing feature.

12. The method of claim 8, wherein the first set of data comprises a first range of data sectors to which data are to be written or from which data are to be read in accordance with the first command plus a second range of data sectors adjacent the first range associated with the operation of the performance enhancing feature.

13. A method comprising:
  enabling a performance enhancing feature that retrieves nonrequested data from a second memory space and places that data in a first memory space;
  receiving first and second commands to transfer data between the second memory space and a host computer; and
  modifying operation of the performance enhancing feature to reduce the amount of nonrequested data stored in the first memory space to avoid a potential overlap conflict between a first set of data associated with the first command and a second set of data associated with the second command.

14. The method of claim 13, further comprising steps of executing a sort strategy on the first and second commands after the performance enhancing feature is modified and executing said commands in an order determined by said sort strategy.

15. The method of claim 13, wherein the disabling step comprises employing a notifier with the first and second commands which provides a status regarding whether the performance enhancing feature is modified for each said command.

16. The method of claim 15, wherein the notifier of the disabling step includes an adjustment value by which the nonrequested value is reduced to avoid the potential overlap conflict.

17. The method of claim 13, wherein the first set of data comprises a first range of data sectors to which data are to be written or from which data are to be read in accordance with the first command plus a second range of data sectors adjacent the first range associated with the operation of the performance enhancing feature.

* * * * *